United States Patent
Bloemer et al.

(10) Patent No.: US 6,392,782 B1
(45) Date of Patent: May 21, 2002

(54) PHOTONIC BAND GAP DUAL-SPECTRUM SENSOR

(75) Inventors: Mark J. Bloemer, Athens; Michael Scalora, Huntsville, both of AL (US); Jonathan P. Dowling, Los Angeles, CA (US); Charles M. Bowden; William C. Pittman, both of Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 26 days.

(21) Appl. No.: 09/606,225

(22) Filed: Jun. 27, 2000

(51) Int. Cl.$^7$ .............................. G02F 1/03; H01S 5/00

(52) U.S. Cl. ................. 359/248; 359/344; 359/585; 359/586; 359/588; 359/587; 359/589; 372/45

(58) Field of Search ................... 359/322, 248, 359/580, 585, 586, 587, 588, 589, 344; 343/909, 911 R; 372/43, 45; 257/451

(56) References Cited

U.S. PATENT DOCUMENTS

| 3,654,809 A | * | 4/1972 | Worden et al. ............. 374/127 |
| 5,740,287 A | * | 4/1998 | Scalora et al. ................. 385/6 |
| 6,262,830 B1 | * | 7/2001 | Scalora ....................... 359/248 |

* cited by examiner

Primary Examiner—Hung Xuan Dang
Assistant Examiner—Tuyen Tra
(74) Attorney, Agent, or Firm—Arthur H. Tischer; Freddie M. Bush; Hay Kyung Chang

(57) ABSTRACT

The photonic band gap (PBG) dual-spectrum sensor utilizes the frequency-selective properties of a photonic band gap device constructed in accordance with this invention to separate incident electromagnetic wave into two frequency bands. The parameters of the PBG device are chosen so that one frequency band is transmitted through the device with low attenuation while the second band is reflected with low attenuation from the front face of the device. This separation of the two frequency bands allows separate detection processes to be performed to recover the information content of the two signals before the information is fused in subsequent signal processing operation. Such a PBG device would be useful in missile seekers that seek to distinguish a target object from its background.

8 Claims, 7 Drawing Sheets

PHOTONIC BAND GAP DUAL-SPECTRUM SENSOR

DEDICATORY CLAUSE

The invention described herein may be manufactured, used and licensed by or for the Government for governmental purposes without the payment to us of any royalties thereon.

BACKGROUND OF THE INVENTION

Incorporation of two or more spectral bands in a missile seeker is not a new idea and is desired for various reasons, among others, such as improving target acquisition and aimpoint selections, hardening the seeker against potential countermeasures, enhancing the capability to attack low-signature targets and air defense suppression capabilities. The introduction of multi-spectrum seekers into field weapon systems, however, has been limited due, at least in part, to the significant increase in the cost and size of a seeker having two or more sensors in different regions of the electromagnetic spectrum and lack of maturity in component technology to allow the separation of spectral bands while minimizing losses.

Since the conception of the photonic band gap (PBG) crystal in 1987, there has been a steady growth in the published literature on the subject. PBG crystals, which can be easily fabricated in one, two or three dimensions in the millimeter and microwave regions of the electromagnetic spectrum, are periodic dielectric lattices that exhibit frequency stop bands over which electro-magnetic wave propagation cannot occur.

SUMMARY OF THE INVENTION

The photonic band gap (PBG) dual-spectrum sensor utilizes the frequency-selective properties of a photonic band gap device constructed in accordance with this invention to separate electromagnetic wave entering through a common aperture into two frequency bands. The parameters of the PBG device are chosen so that one frequency band is transmitted through the device with low attenuation while the second band is reflected with low attenuation from the front face of the device. This separation of the two bands allows separate detection processes to be performed to recover the information content of the two signals before the information is fused in subsequent signal processing operation. Further, the fact that the PBG crystal bandgap can be tailored by the proper selection of material properties gives the sensor designer a wider range of choices than are available from conventional materials.

DESCRIPTION OF THE PREFERRED EMBODIMENT

Figure 1:
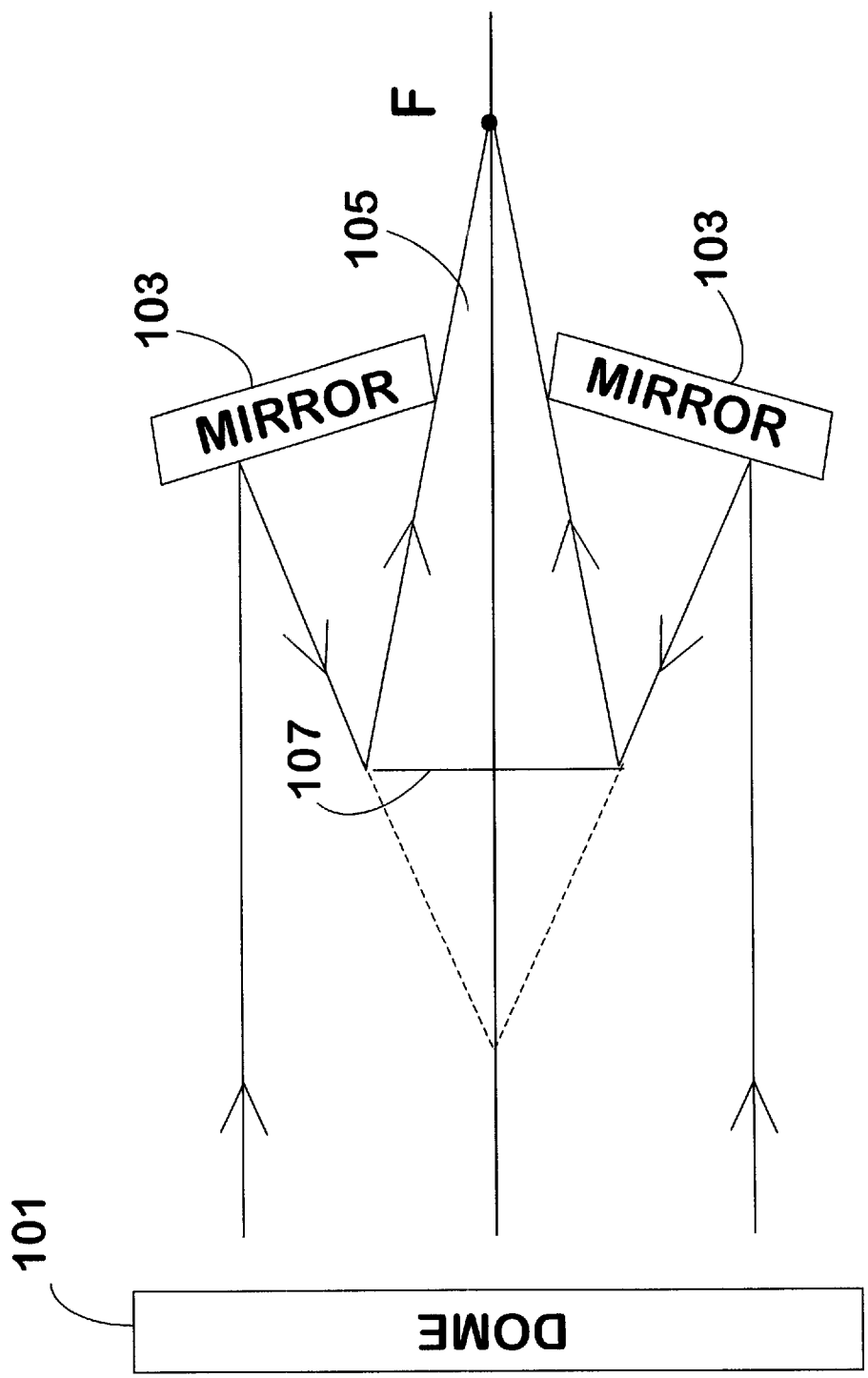
FIG. 1 illustrates a traditional Cassagrainian optics system.

Referring now to the drawing wherein like numbers represent like parts in each of the several figures, the principles and operation of the photonic band gap (PBG) dual-spectrum sensor are explained.

In the traditional Cassagrainian optics system, illustrated in FIG. 1, electromagnetic energy transmitted through dome 101 is incident on convex primary mirror 103 which collects the energy and redirects it to concave secondary mirror 107 located inside the prime focus. The secondary mirror further directs the energy through hole 105 in the primary mirror to a new focus, F. This combination of two mirrors has an effective focal length that is longer than that of the primary mirror, but the folding of the optical path allows efficient packaging of the system in objects where space is at a premium, such as a missile seeker.

Figure 2:
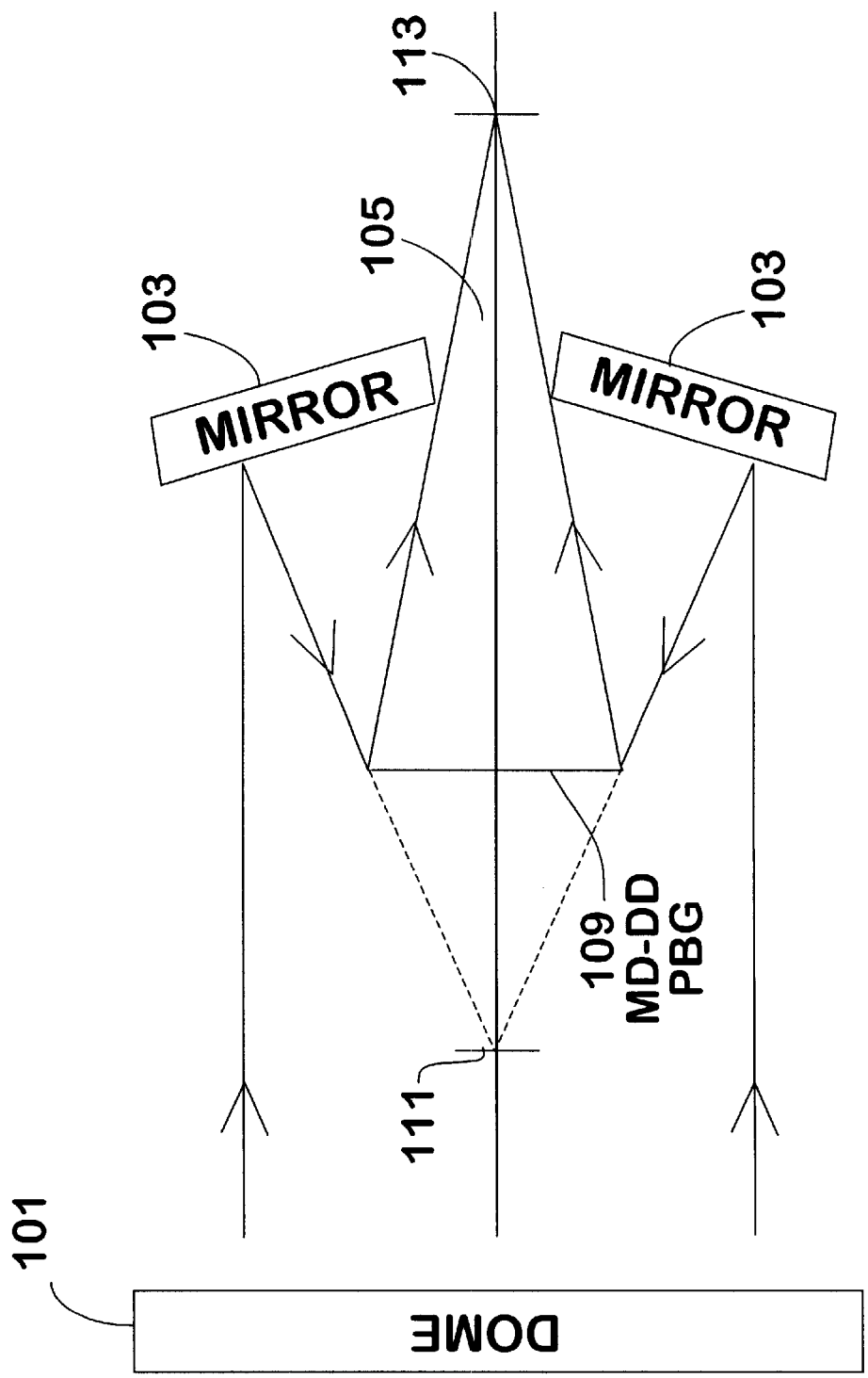
FIG. 2 shows the positioning of MD-DD PBG device in a Cassagrainian optics system so as to achieve the separation of two spectral bands.

In the improved Cassagrainian optics system shown in FIG. 2, the secondary mirror is replaced by MD-DD PBG device 109 that transmits energy of one frequency band and reflects energy of a second frequency band. This separation of the incoming radiation bands of interests can be performed by utilizing a one dimensional metallo-dielectric photonic band gap (MD PBG) structure in combination with an ordinary dielectric-dielectric photonic band gap (DD PBG) structure.

Figure 3:
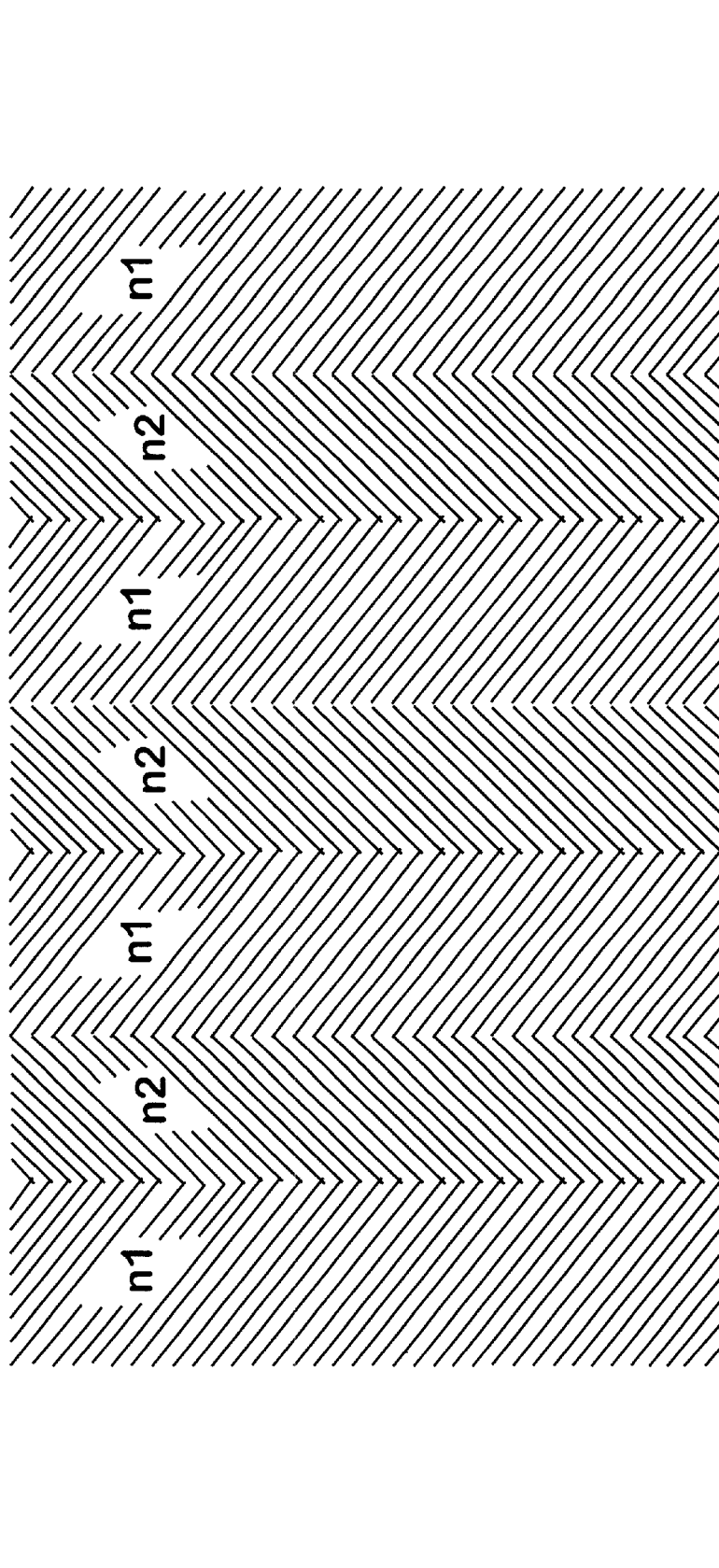
FIG. 3 illustrates a typical one-dimensional photonic band gap structure composed of alternating high and low index layers of dielectric material.
Figure 4:
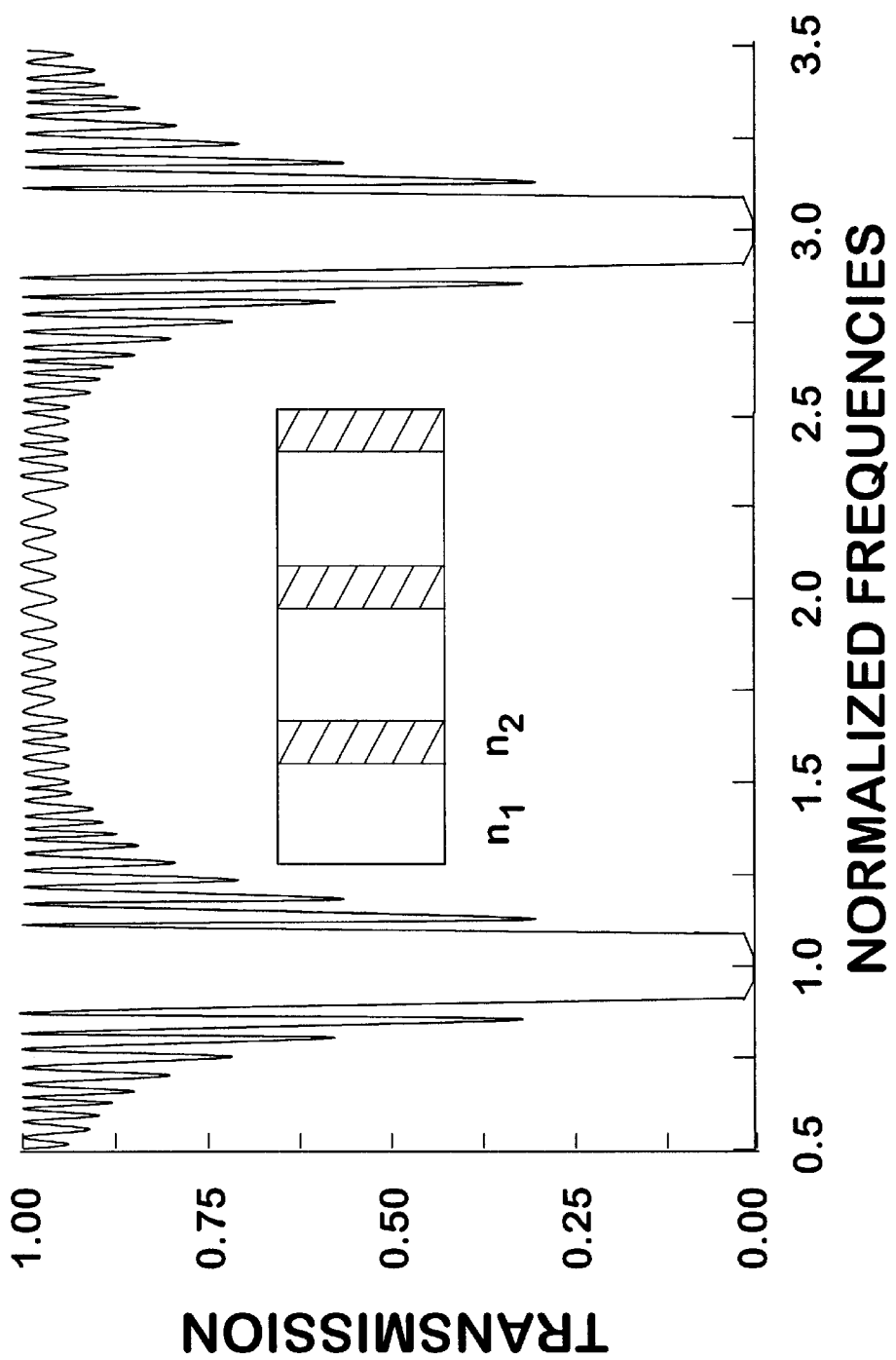
FIG. 4 presents the characteristic transmissive properties of the typical one-dimensional photonic band gap structure of FIG. 3.

In one dimension, a photonic band gap device is usually composed of alternating high and low index layers of dielectric material. Such a typical device is illustrated in FIG. 3. Each layer is constructed so that its width is a fraction of the size of a given reference wavelength, usually one quarter of the reference wavelength, thus forming a quarter-wave stack. As a consequence of this arrangement of the dielectric layers, interference effects cause some wavelengths of incident radiant energy to be transmitted, while a range (i.e. plus or minus 20% of the reference wavelength) of wavelengths centered about the reference wavelength, often referred to as "band gap" wavelengths, are completely reflected. It is this absence of certain wavelengths from the transmitted spectrum that gives rise to the name "band gap," in analogy to the electronic band gap of semiconductors. FIG. 4 presents the characteristic transmissive properties of the typical one-dimensional photonic band gap device of FIG. 3. Thus, a range of wavelengths about the reference wavelength cannot propagate inside this device. It is noted that usually the reflective properties of the device are such that where the transmission is a maximum, the reflection is a minimum, and vice versa.

Due to the excellent transmissivity (i.e. low absorption) of radiant energy of 3–5 micrometers and 8–12 micrometers through the atmosphere, most missile seekers in current use function in these bandwidths. The photonic band gap dual-spectrum sensor provides a way to equip a class of seekers known as common aperture seekers with a means to separate the 3–5 micron band from the 8–12 micron band. This is accomplished by transmitting the 3–5 micron bandwidth through a photonic band gap device formulated in accordance with this invention while reflecting all other wavelengths including the 8–12 micron band.

Typically, the materials used in the fabrication of PBG structures are either dielectric or semiconductor substances due to their low absorption characteristics. This is important because it is critical that the materials used not absorb radiant energy to any significant extent so as not to compromise device operation. For this reason, metallic substances are almost exclusively used to enhance the reflective properties of dielectric or semiconductor materials by designing and incorporating within a particular PBG device thick (i.e. greater than 90 nm) metallic films such as silver, nickel, copper, aluminum or gold.

It has been shown, however, that if one of the dielectric materials from an ordinary, all-dielectric PBG structure described above is replaced with a metal (Ag, Au, Cu, Al or any other transition metal), then light can resonantly tunnel through the structure with minimal absorption losses. For example, if approximately 90 nm of Ag were arranged in a three-period MD PBG structure, where each Ag layer is approximately 30 nm and each dielectric layer consists of approximately 140 nm of $MgF_2$, then the structure can still transmit in excess of 50% of the incident visible light. This level of transmission renders a window that has been coated with such MD PBG material effectively transparent to the human eye. At the same time, transmission of all lower electromagnetic frequencies which include infrared and microwave radiation and static fields is suppressed. In other words, such an MD PBG material, in effect, behaves like a transparent metal. In contrast, a thick, 90 nm Ag single-bulk layer would reflect all light across the spectrum, transmitting, on the average, only 0.1% of the visible wavelengths, thus rendering itself effectively opaque to nearly all incident radiation. The width and location of the transmission bands depend primarily on the width of the dielectric layers: that is, thicker dielectric layers cause the transmission bands to redshift to longer wavelengths toward the infrared region, while thinner dielectric layers cause a blueshift of the pass band toward the ultraviolet.

In order to transmit radiant energy in the 3–5 micron bandwidth and reflect energy in the 8–12 micron bandwidth, the MD PBG device must exhibit two fundamental characteristics: one, the optical path of the dielectric layer must be considerably larger than the optical path of 140 nm of $MgF_2$ in order to redshift the pass band from the visible to the 3–5 micron range; two, all high-frequency MD PBG pass bands that characterize a typical MD PBG must be suppressed to avoid sensor saturation from high-intensity coherent or incoherent sources that may operate in the visible or infrared regions.

Figure 5:
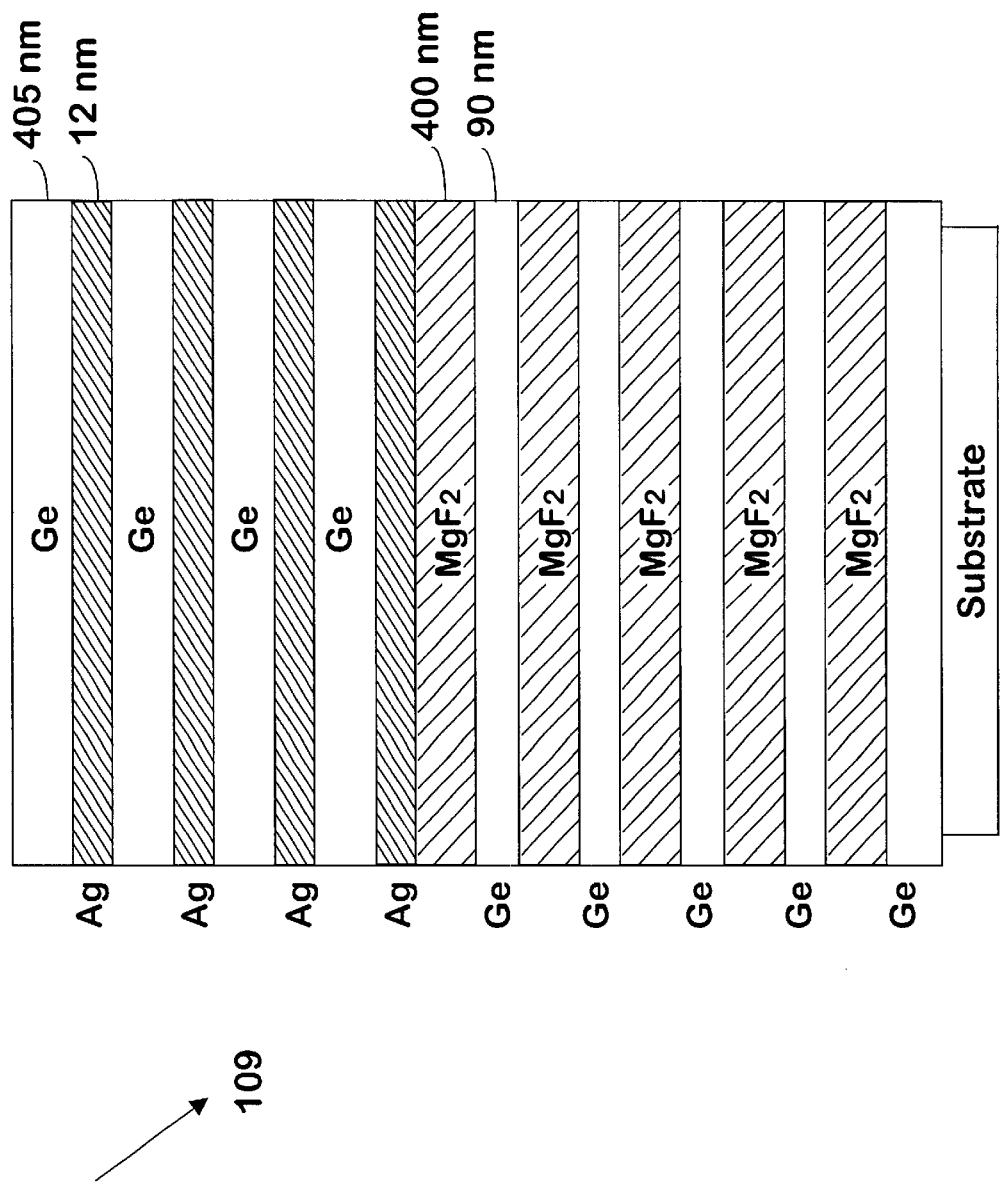
FIG. 5 illustrates a preferred embodiment of combinational MD-DD PBG device 109 composed of a four-period Ag (about 12 nm)/Ge (about 405 nm) MD PBG grown on a five-period $MgF_2$ (about 400 nm)/Ge (about 90 nm) DD PBG.
Figure 6:
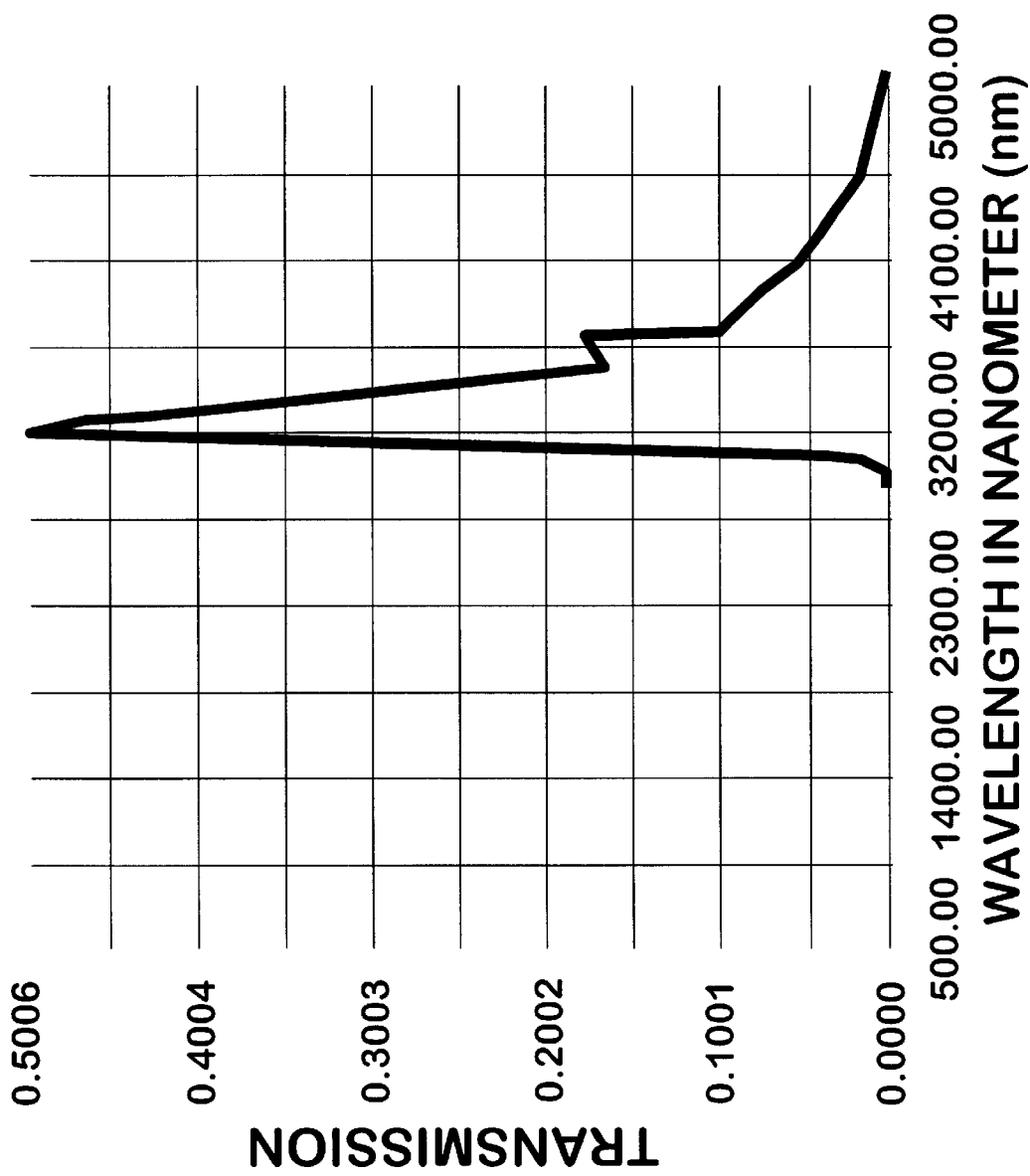
FIG. 6 is a graphic depiction of the transmissive properties of MD-DD PBG device 109.

PBG device 109 displaying above required characteristics may be composed of a four-period Ag (about 12 nm)/Ge (about 405 nm) MD PBG grown on a five-period $MgF_2$ (about 400 nm)/Ge (about 90 nm) DD PBG with the whole device mounted on a suitable substrate such as Ge or $MgF_2$. The structure of device 109 is depicted in FIG. 5 where each of the thicknesses indicated in nanometers is the median of parameters ranging from minus 10% to plus 10% of the cited thickness. The transmissive properties of PBG device 109 is shown in FIG. 6 from which it can be seen that almost 50% of the light in a range between 3 and 4 microns is transmitted through the device while all radiation wavelengths, including those wavelengths in the 8–12 microns range is completely reflected. The transmitted and reflected portions of the incident radiant energy are each detected by separate detectors 111 and 113, respectively, as illustrated in FIG. 2, thereby enabling information to be recovered from each portion and subsequently fused in signal processing operation to enhance the operation of the missile seeker. The transparency window near 3 microns can be tuned by varying the width of the germanium spacers in the MD or DD PBG to maximize the transmission of the single pass band in the region of interest.

The set of MD PBG layers and the set of DD PBG layers as described above do not have to be stacked together but may sandwich the substrate between them yielding identical results yet affording added flexibility in structure design in case material compatibility and growing techniques between the MD PBG and DD PBG portions present serious fabrication problems.

Figure 7:
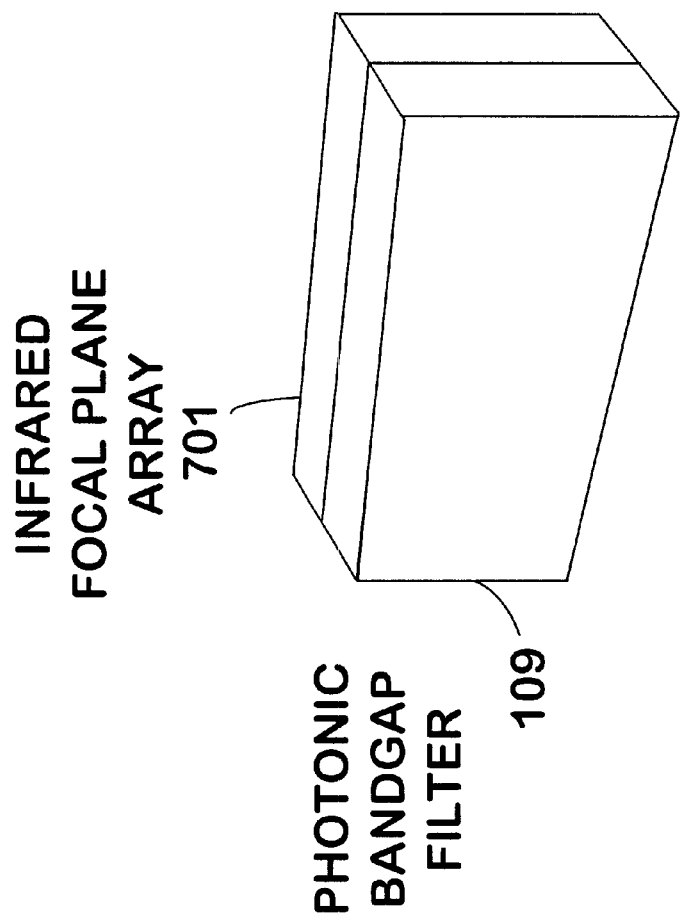
FIG. 7 shows a use of MD-DD PBG device 501 as a filter for infrared energy illuminating an infrared focal plane array.

MD-DD PBG device 109 can also be used as a filter for infrared energy illuminating infrared focal plane array 701 as shown in FIG. 7 and made to be tunable over the array response band. The focal plane array can be either a scanner, composed of a single detector or several detectors, for scanning the field of view or be a staring array in which the entire scene illuminates an array of a large number of detectors in parallel, although advances in producibility of high-density staring arrays have made them more affordable. In addition, between staring and scanning systems of equivalent sensitivity, the staring system is more compact. MD-DD PBG device 109 can be integrated onto the focal plane array during the manufacturing process for the focal plane array and coated with an anti-reflectance substance on the outside surface of the device to ensure that nearly 100% radiative transmission is achieved through the MD-DD PBG device for excitation of the focal plane array.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A device for selectively transmitting radiation therethrough to separate incident radiation for separate subsequent processing, said device being a periodic structure and comprising: a first set of metallo-dielectric photonic band gap (MD PBG) layers, said MD PBG layers being four in number and identical in composition and each MD PBG layer being comprised of a first germanium sublayer and a silver sublayer; a second set of dielectric-dielectric photonic band gap (DD PBG) layers, said DD PBG layers being five in number and identical in composition and each DD PBG layer being comprised of a magnesium floride sublayer and a second germanium sublayer, said first and second sets being in the proximity of each other; and a substrate, said substrate supporting said first and second sets, said sets co-operating with each other so as to transmit through said periodic structure a first incident radiation of 3–5 microns while reflecting a second incident radiation of 8–12 microns.

2. A device for selectively transmitting radiation therethrough as described in claim 1, wherein said silver sublayer has a thickness of between 360 nanometers and 450 nanometers, said magnesium floride sublayer has a thickness of between 360 nanometers and 440 nanometers, said first germanium sublayer has a thickness of between 10 and 14 nanometers and said second germanium sublayer has a thickness of between 80 and 100 nanometers.

3. A device as described in claim 2, wherein said silver sublayer is about 12 nanometers thick, said magnesium floride sublayer is about 400 nanometers thick, said first germanium sublayer is about 405 nanometers thick and said second germanium sublayer is about 90 nanometers thick.

4. A device as described in claim 3, wherein said first and second sets of layers are adjacent to each other.

5. A device as described in claim 3, wherein said first and second sets of layers sandwich said substrate therebetween.

6. In a Cassagrain optics system having a primary mirror bearing a hole through the center thereof, the primary mirror reflecting incident radiation toward a focus; AN IMPROVEMENT FOR separating the incident radiation into dual bands for separate processing, said IMPROVEMENT comprising a combination photonic band gap device positioned to intercept the radiation reflected from the primary mirror, said combination photonic band gap device being comprised of a first set of metallo-dielectric photonic band gap (MD PBG) layers and a second set of dielectric-electric photonic band gap (DD PBG) layers, said first and second sets being in the proximity of each other; a substrate, said substrate supporting said first and second sets, said sets cooperating with each other so as to transmit therethrough a first portion of pre-determined wavelengths while reflecting a second portion of all other wavelengths; a first detector to receive said first portion and a second detector to receive said second portion.

7. AN IMPROVEMENT in a Cassagrainian optics system as described in claim 6, wherein said MD PBG layers are four in number and identical in composition and each MD PBG layer is comprised of a first germanium sublayer and a silver sublayer; and said DD PBG layers are five in number and identical in composition and each DD PBG layer is comprised of a magnesium floride sublayer and a second germanium sublayer.

8. AN IMPROVEMENT in a Cassagrainian optics system as described in claim 7, wherein said silver sublayer is about 12 nanometers thick, said magnesium floride sublayer is about 400 nanometers thick, said first germanium sublayer is about 405 nanometers thick and said second germanium sublayer is about 90 nanometers thick.

* * * * *